3,464,938
MODIFIED CARBAMATE ESTER
CONTAINING POLYMERS
John David Nordstrom, Bloomington, Minn., assignor to
Ashland Oil & Refining Company, Ashland, Ky., a corporation of Kentucky
No Drawing. Filed Nov. 18, 1966, Ser. No. 595,327
Int. Cl. C08f 45/72; C08g 51/84, 41/00
U.S. Cl. 260—21
9 Claims

ABSTRACT OF THE DISCLOSURE

Modified carbamate ester aminotriazine polymer compositions, which are the reaction products of:

(a) a carbamate ester containing polymer which is the reaction product of urea and a polymer having at least three free hydroxyl groups, and (b) an aminotriazine, such as melamine, having at least two reactive amino groups, and (c) an aliphatic monoaldehyde, such as formaldehyde, can be used to cross-link polyesters and acrylic polymers, with which they exhibit excellent compatability.

---

The present invention relates to novel compositions obtained by the reaction of a carbamate ester containing polymer, an aldehyde, and an aminotriazine, to methods of making and using such compositions, and to curable blends of these novel compositions in combination with other polymers.

Attempts have been made to use carbamate ester containing polymers or aldehyde-modified carbamate ester containing polymers as cross-linking agents in coating compositions comprising other polymers such as polyesters or acrylic polymers. However, the aldehyde-modified carbamate ester containing polymers and to a greater degree the unmodified carbamate ester containing polymers are not entirely suitable because they often have low compatibility with these other polymers. Melamine-aldehyde resins have likewise been used as cross-linking agents for other polymers but are not entirely compatible with these other polymers.

I have now discovered that certain carbamate ester containing polymers when condensed with an aminotriazine and an aldehyde yield polymeric compositions having advantages over the prior art unmodified carbamate ester containing polymers, formaldehyde-modified carbamate ester containing polymers and melamine-formaldehyde resins.

The polymeric compositions of the present invention find utility in coating composition as film-formers and as cross-linking agents for other polymers such as polyesters and acrylics with which they exhibit excellent compatibility. In this regard, the polymeric compositions of the present invention have been found to be an excellent substitute for melamine-aldehyde cross-linking agents.

As previously stated, the polymeric compositions of the present invention are the reaction products of a carbamate ester containing polymer, an aminotriazine, and an aldehyde. The aminotriazine has at least two and can have three reactive amino groups, an example of which is melamine having three reactive amino groups. The aldehyde is an aliphatic monoaldehyde of 1–8 carbon atoms, as for example, formaldehyde. In these novel compositions, 1–95% of the reactive amino groups are derived from the carbamate ester containing polymer, the remainder being derived from the aminotriazine. The carbamate ester containing polymer constitutes 5–95% and preferably 10–70% by weight based on combined weight of the polycarbamate and aminotriazine of the novel composition, and the ratio of the aldehyde to the total reactive amino groups supplied by the carbamate ester containing polymer and the aminotriazine is from 1 to 3 and preferably from 1.5 to 2.5.

The term "carbamate ester containing polymer" is meant to define any polymer having three or more carbamate ester amino groups i.e.,

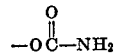

attached to the polymer chain. The polymeric compositions of the present invention contain alkylol amino groups —NH(alkyl)OH which can be etherified by reaction with alcohols to form ether derivatives of these polymers having ether groups —NH(alkyl)O(alkyl).

The term "reactive amino group" is meant to define an amino group containing at least one hydrogen capable of reacting with formaldehyde. The other hydrogen can be replaced by any noninterfering substituent such as aliphatic and especially lower alkyl. Coating compositions of other polymers in combination with the above-described modified carbamate ester aminotriazine exhibit higher solvent resistance and greater flexibility on curing than coating compositions free of the modified carbamate ester polymers. In addition to these improved properties, the modified carbamate ester aminotriazine polymers exhibit a greater degree of compatibility with other coating resins capable of being cross-linked by reaction with etherified alkylol amino groups.

These modified carbamate ester aminotriazine polymers can be formed by reacting together the carbamate ester containing polymer, the aminotriazine, and the aldehyde in aqueous media or in organic solvents under conditions similar to those employed for the condensation of melamine with formaldehyde, which are well known in the art. In general, the reaction is conducted by heating an aqueous and/or alcoholic mixture of the reactants at temperatures of 40° C. to 120° C. If the reaction is carried out under alkaline conditions by the use of a basic catalyst, the condensation can be stopped at the alkylol stage, the extent of reaction is followed by titrating for percent free formaldehyde, thus producing a carbamate ester aminotriazine polymer containing alkylol groups. If the condensation is carried out under acid conditions in the presence of an acidic catalyst and alcohol, the etherified derivative of the modified carbamate ester aminotriazine polymers is formed and water is evolved by a by-product.

Both the modified carbamate ester aminotriazines compositions and the ether derivatives thereof can be employed as film-forming resins or as cross-linking agents in combination with other film-forming resins. The modified carbamate ester aminotriazine polymers in the alkylol form exhibit higher reactivity towards materials capable of reacting with hydroxyl or amino hydrogens such as, for example, hydroxyl-terminated polyesters or polyurethanes, than the ether derivatives of the modified carbamate ester aminotriazine polymers. Hence, the alkylol form of the modified carbamate ester aminotriazine polymers of the present invention are employed in applications requiring rapid reaction or curing, whereas the ether derivatives are employed in applications where reaction or curing can be carried out over a longer period of time or at elevated temperatures.

The aqueous or alcoholic solvents are employed in sufficient amounts to allow proper temperature control of the reaction and, where the resin is in solution, to prevent excessive viscosities. Examples of alcoholic solvents which can be employed include, among others, methanol, ethanol, n-propanol, isopropanol, n-butanol, sec-butyl alcohol, isobutanol, octanol and hexadecanol. Widely varying quantities of solvents can be employed without affecting the ability of the reaction to proceed. Although the solvent can comprise from less than 1% to over 99% by weight of reaction mixture 20–80% has been found suitable, and 50% is preferred.

Suitable basic catalysts employed to prepare the alkylol-modified carbamate ester aminotriazine compositions include strong alkali metal hydroxides, carbonates, and bicarbonates such as sodium hydroxide, potassium hydroxide, sodium carbonate, and sodium bicarbonate, and tertiary amines such as pyridine, triethylamine, N,N-dimethyl ethanolamine. In general, any basic catalyst can be employed which when added to the reaction mixture will give a pH of between about 7 and 14 and preferably between about 7 and 11.

Suitable acidic catalysts employed to prepare the ether derivatives of the modified carbamate ester aminotriazine compositions include the inorganic acidic catalysts such as the mineral acids, e.g., aqueous sulfuric acid, hydrochloric acid, phosphoric acid, and nitric acid, as well as their salts of weak bases such as ammonium salts. Other acid catalysts include the organic acids such as maleic acid, p-toluene sulfonic acid, oxalic acid, fumaric acid, lactic acid, benzoic acid, and formic acid as well as compatible mixtures of two or more of the above. The anhydrides of the above-mentioned acidic catalysts can also be employed. In general any acidic catalyst can be employed which when added to the reaction mixture will give a pH of between about 1 and 6 and preferably between about 3 and 5.

Aminotriazines suitable for the preparation of the modified carbamate ester aminotriazine compositions are those having at least two reactive amino groups such as those of the following formula:

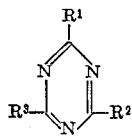

wherein $R^1$, $R^2$, and $R^3$ can be hydrogen, lower alkyl, aryl, aralkyl, amino or amino substituted with lower alkyl, aryl, or aralkyl, with the proviso that the compound have at least two reactive amino groups.

N-substituted aminotriazines within the above definition having at least two reactive amino groups can also be employed. Examples of specific aminotriazines include, among others, 2,4-diamino-1,3,5-triazine(guanamine); 2-methyl-4,6-diamino-1,3,5-triazine; 2-phenyl-4,6-diamino-1, 3,5-triazine(benzoguanamine); 2 - methyl-4-methylamino-6 - amino-1,3,5-triazine; 2 - phenylamino - 4-methylamino-6 - hydroxyethylamino - 1,3,5 - triazine; 2 - benzyl-4-amino-6-phenylamino-1,3,5-triazine; and melamine which is preferred because of its ready availability, low cost and high reactivity. Art recognized equivalents of aminotriazines such as the various methylol melamines can also be used.

Most aldehydes or aldehyde-producing reactants are suitable for the preparation of the modified carbamate ester aminotriazine polymers of the present invention. The preferred aldehydes are the alkyl monoaldehydes of the general formula RCHO, where R is hydrogen or alkyl, of 1–18 carbon atoms, such as formaldehyde which is particularly preferred, acetaldehyde, propanaldehyde, butyraldehyde, isobutyraldehyde, stearyladehyde, etc. Examples of other suitable aldehydes of aldehyde-producing reactants include cinnamaldehyde, crotonaldehyde, furfural, benzaldehyde, glyoxal, hexamethylenetetramine, and methacrolein.

The preferred carbamate ester containing polymers of the present invention are those having an average of three or more reactive carbamate ester amino groups per polymer molecule. Of particular value are carbamate esters containing polymers containing on the average of from 3 to 12 carbamate ester groups per polymer molecule.

The carbamate ester containing polymers used in the present invention can be formed by reacting urea with any polymer having three or more free hydroxyl groups in the polymer such as, for example, certain polyesters, polyvinyl alcohol, copolymers of vinyl alcohol and ethylene, methyl methacrylate or ethyl acrylate, copolymers of hydroxy alkyl acrylates and other acrylate esters, polyether polyols, copolymers of styrene and allyl alcohol, cellulosic polymers, and the like.

It is not essential that all the hydroxyl groups in the polymer employed be converted to carbamate ester groups. The unconverted hydroxyl groups can be further reacted with other functional components to achieve other desirable properties. Thus, the unconverted hydroxyl groups can be reacted with carboxylic acids or their anhydrides, such as acetic acid or maleic anhydride, for example, to get polymers which can be made to result in carboxyl-containing polymers, soluble in water.

The preferred hydroxy-containing polymers employed in the preparation of the novel resins of the present invention are hydroxy-containing polyesters which are basically reaction products of polycarboxylic acids and polyols in which the polyol is generally employed in the reaction in an excess of 10% to 100% of the stoichiometric to assure that the polyesters are hydroxyl group-terminated. The formation of the polyesters is well known in the art, as for example, in the alkyd resin technology. Polycarboxylic acids, which are employed as such or in the form of their anhydrides, include saturated aliphatic dicarboxylic acids having 2–36 carbon atoms such as malonic acid, succinic acid, glutaric acid, adipic acid, pimelic acid, suberic acid, azelaic acid, dimer fatty acids, sebacic acid, brassylic acid, etc.; aromatic acids having 8–12 carbon atoms such as phthalic acid, terephthalic acid, isophthalic acid, naphthalic acid, etc.; cycloaliphatic acids having 5–14 carbon atoms such as cyclopropanedicarboxylic acid, 1,6-cyclohexanedicarboxylic acid, etc.; and unsaturated acids such as maleic acid, fumaric acid, 3,6-methylene-4-cyclohexene - 1,2 - dicarboxylic acid, etc. The properties of the polyester resins employed in the present invention, particularly the molecular weight of the resin, can further be modified by the use of monocarboxylic acids having 2–18 carbon atoms such as acetic acid, benzoic acid, tertiary butyl benzoic acid, oleic acid, etc., or by the use of tri- and higher polycarboxylic acids such as trimellitic acid and pyromellitic acid.

The polyols employed in the preparation of hydroxy-containing polyesters contain two or more hydroxyl groups. Mixtures of such polyols can also be used. The polyols are employed in at least sufficient concentrations to assure the formation of a polyester having a hydroxyl number of at least about 10 and preferably greater than 100. Examples of suitable polyols include the diols such as ethylene glycol, diethylene glycol, propylene glycol, 1,2-hexanediol, and polyethylene glycols, as well as the higher alcohols such as trimethylol propane, trimethylol ethane, tetramethylol cyclohexanol, erythritol, penta erythritol, sorbitol, glycerol, and 1,2,6-hexanetriol, or mixtures thereof. In general, such polyols are aliphatic or cycloaliphatic in nature and contain from 3–8 carbon atoms. The polyesters employed in the present invention can further be oil-modified with mono-, di-, and triglycerides of fatty acids such as stearic acid. This modification is well-known in the art and thus requires no further detailed description.

As indicated, methods for the preparation of the hydroxy-containing polyesters are known in the art. In general, dicarboxylic acids are heated with polyols with or without solvent while the water resulting from the condensation is continually removed. A preferred method is to heat at reflux the reactants under atmospheric or internally generated pressure with 10–70 weight percent of an inert aromatic hydrocarbon solvent, such as xylene, in the presence of 0.1 to 2.0 weight percent, based on the reactants, of an acid catalyst such as p-toluene sulfonic acid, at temperatures of 100° C. to 250° C., under a blanket of inert gas such as nitrogen until all of the resulting water has been removed by azeotropic distillation. The hydroxy-containing polyesters obtained normally have hydroxyl numbers, a property well known in the art, of 50–500, although resins having hydroxyl numbers of at least 10 but outside this range are also suitable.

The conversion of the hydroxy-containing polyester to the carbamate ester containing polymer can be accomplished by various methods, of which the reaction of urea with the polyester is preferred. The reaction of the polyester with urea, although not requiring a catalyst, is preferably performed in the presence of a metal salt catalyst such as zinc chloride, zinc acetate, silver nitrate, cobalt chloride, tin dichloride, and tin tetrachloride. The polyester and the urea are charged to a vessel equipped with an agitator and a reflux condenser. Xylene or other inert diluent is employed as a means of controlling the reactor temperature. The catalyst is added in concentrations of 0.1% to 10% by weight of the reactants and the agitated mixture is heated at 130° C. to 160° C. until the desired conversion is accomplished. The conversion can be determined by the cessation of evolution of ammonia gas from the reaction, or by periodically withdrawing a sample and determining the hydroxyl number. The resultant carbamate ester containing polymer can be a viscous liquid or a solid resin. The amount of urea employed in the reaction depends on the degree of conversion of hydroxyl to carbamate desired, as discussed above. For substantially complete conversion of the reactive hydroxyl groups, equivalent amounts or slight excesses of urea are employed. No advantage results from the use of large excesses of urea. Other methods of forming carbamates useful in the present invention are given in U.S. Patent 2,956,964, issued Oct. 18, 1960.

The formation of carbamate ester groups employing urea is greatly preferred when it is desired to convert only the primary hydroxyl groups of hydroxy-containing polymers, since the reaction of urea with secondary hydroxyl groups is sluggish. However, the conversion of secondary hydroxyl groups to carbamate esters can be accomplished by reacting the polyester having secondary hydroxyl groups with liquid phosgene in an inert solvent to convert the hydroxyl groups to chloroformate groups, thus forming a polychloroformate. The polychloroformate is then reacted with two equivalents of ammonia to form the carbamate ester containing polymer and byproduct ammonium chloride. The carbamate ester containing polymer obtained on removal of the ammonium chloride is equivalent to the carbamate ester containing polymer formed by using urea. It is to be pointed out that the latter synthesis can be employed to form carbamate ester groups from both primary and secondary hydroxyl groups. The carbamate ester containing polymers are then reacted with an aldehyde and an aminotriazine as described above, to form the modified carbamate ester aminotriazine compositions of the present invention.

The etherified derivatives of the modified carbamate ester aminotriazine polymers of the present invention are condensation products of aliphatic alcohols of 1–16 carbon atoms with the modified carbamate ester aminotriazine polymers. Examples of suitable alcohols include, among others, methanol, ethanol, n-propanol, isopropanol, n-butanol, sec-butanol, isobutanol, octanol, and hexadecanol. The etherified derivatives of the polymers of the present invention can contain only a few ether groups or can have all of the alkylol groups formed in the initial condensation converted to ether groups.

As described above, these etherified derivatives can be formed if the reaction of the carbamate ester containing polymer, the aldehyde, and the aminotriazine is carried out in the presence of the above-mentioned alcohols and an acidic catalyst. Alternatively, the modified carbamate ester aminotriazine polymers formed under alkaline conditions can be dissolved in an acidic alcoholic media to convert it to the etherified derivative. This reaction can be carried out at atmospheric pressure at a temperature of from 0° C. to 190° C. and preferably from 35° C. to 130° C. at a pH of less than 7 and preferably from 3 to 7. The above-described acid catalysts can be used. The water formed during this reaction is removed by azeotropic distillation.

In forming the ether derivative of the modified carbamate ester aminotriazine polymer, the alcohol is generally employed in excess of that amount required to convert all of the alkylol groups in the resin. If partially etherified polymers are desired, the etherification can be interrupted prior to completion by neutralizing the acidic reaction mixture. Alternatively, less than sufficient alcohol for complete conversion can be employed. Completion of the reaction is indicated when no more water distills off.

Coating compositions employing the modified carbamate ester aminotriazine compositions of the present invention form excellent mar-resistant, chemical-resistant coatings when applied to a substrate and cured. These coating compositions can consist entirely of the modified carbamate ester aminotriazine polymers or of a mixture of this polymer with one or more cross-linkable materials. Examples of these cross-linkable materials are polyesters, such as those used as precursors used for making the carbamate ester containing polymers described above or oil-modified alkyd resins containing unreacted hydroxyl or carboxyl groups, these being common in the coatings art; polyester polyurethanes prepared by reacting two moles of a triol such as trimethylol propane with one mole of diisocyanate such as toluene diisocyanate and then forming a polyester by reaction with a dibasic acid such as terephthalic acid; and acrylic copolymers such as the terpolymer of styrene, methyl methacrylate and N-methylol acrylamide or a copolymer of butyl methacrylate and 2-hydroxyethyl methacrylate. Generally, polymers which are reactive with aminotriazine resins common in the art, i.e., those containing hydroxyl, carboxyl, N-methylol or etherified N-methylol groups, are reactive toward cross-linking by the aldehyde-modified carbamate ester aminotriazine compositions of this invention.

The resultant composition can contain from less than 1% to more than 90% and preferably from 5% to 40% of the modified carbamate ester amino-triazine polymer, based on the total polymer weight of the resultant composition.

The compositions can be cured in air at room temperature (20° C.) or below, although higher temperatures such as 50° C. to 200° C. accelerate the curing process. The temperatures of 125° C. to 175° C. are especially preferred. Depending on the temperature within this range, curing is generally complete in about ten to sixty minutes.

The modified carbamate ester aminotriazine polymers of the present invention are solvent-soluble polymers. Solvents for the aldehyde modified carbamate ester aminotriazine compositions are commonly the alcoholic solvents in which the ether derivatives are prepared, as described above, or water and mixtures of water and compatible cosolvents such as alcohols or ether alcohols (butyl Cellosolve) if the compositions have not been etherified. By chemical modification, as described above, water-soluble etherified modified carbamate ester aminotriazine polymers can be prepared. Coating compositions containing these polymers can be applied to substrates by such techniques as brushing, rolling, or spraying followed by curing through heating or by other means such as irradiation, to form coatings of superior mechanical properties and chemical resistance. The coating compositions comprising the modified carbamate ester aminotriazine polymers of the present invention can contain such additives as are normally added to commercial coating compositions such as, for example, pigments, fillers, dryers, extenders, and the like. These coating compositions can be applied with good adhesion and film properties to virtually any substrate such as, for example, wood, metal, glass, cement, ceramics, and the like.

The modified carbamate ester aminotriazine polymers of the present invention are furthermore of particular utility as the cross-linking agents for other coating resins having reactive hydroxyl, carboxyl, or N-methylol groups, such as polyesters and acrylic resins. In this utility, the modified carbamate ester aminotriazine polymers are superior to previously employed cross-linking agents in view of their greater compatibility with the coating resin.

The invention is further illustrated by the following nonlimiting examples wherein all parts and percentages are by weight unless otherwise indicated.

EXAMPLE 1

This example illustrates the preparation of a modified carbamate ester aminotriazine polymer ether derivative containing 10 weight percent of total amino reactant as polycarbamate polymer.

The carbamate ester containing polymer used in this example is prepared by heating a polyester prepared from 6 moles of trimethylol propane and 5 moles of adipic acid with 8 moles of urea in the presence of 16 gms. of a stannic chloride catalyst. The theoretical carbamate ester equivalent weight of the resin obtained is 213. The carbamate ester containing polymer (14 parts) is dissolved in 1-butanol (420 parts) by warming the mixture to 80° C. in a flask fitted with a stirrer, a water separating head, a thermometer, and a nitrogen inlet. Melamine (126 parts), 37% aqueous formaldehyde (567 parts), and water (108 parts) are added and the pH adjusted to 9.9 with 20% aqueous sodium hydroxide. The equivalent ratio of formaldehyde to amino groups is 2.29.

The mixture is heated and stirred at reflux under a nitrogen atmosphere until 540 parts of water are removed by azeotropic distillation. This step requires a period of about ten hours. The pH is 6.8 and temperature of reflux is 115° C. at the end of this period. The pH is then adjusted to 4.8 by adding phthalic anhydride. Heating is then resumed. After a period of two hours at reflux, 28 parts additional water is removed. The reflux temperature at the end of this period is 118° C. The pressure in the flask is then lowered to 110 mm. Hg and 80 parts of distillate are removed by distillation. Butanol (85 parts) is added and the distillation repeated, leaving the resin remaining in the flask. The resin is filtered while hot and adjusted to 60% nonvolatile content with butanol. The viscosity of the water while, clear resin, hereinafter termed resin A, is 6.9 stokes.

EXAMPLE 2

This example illustrates the production of modified carbamate ester aminotriazine polymers in which 20 weight percent of the amino reactant is supplied by a carbamate ester containing polymer.

The modified carbamate ester aminotriazine polymer ether derivative, hereinafter termed resin B, is prepared by the procedure described in Example 1 employing the same conditions, times, and reactants, except that the amount of carbamate ester containing polymer is 31.5 parts and the quantity of formaldehyde is adjusted accordingly to maintain the formaldehyde to amino groups ratio at 2.29.

EXAMPLE 3

This control example is not illustrative of the present invention but is set forth for comparison. A melamine-formaldehyde resin, hereinafter termed resin C, is prepared by the procedure described in Example 1 employing the same conditions, times, and reactants, except that no carbamate ester containing polymer is used. The equivalent ratio of formaldehyde to amino groups is 2.29 as in Examples 1 and 2. In this example, all of the amino groups are supplied by the melamine.

EXAMPLE 4

This example illustrates the preparation of modified carbamate ester aminotriazine polymer ether derivatives in which 67% of the amino reactant is supplied by a carbamate ester containing polymer. This example also illustrates the excellent hardness and mar-resistance exhibited by a film comprising the novel resins of the present invention.

The carbamate ester containing polymer described in Example 1 (106 parts), melamine (53 parts), and butanol (575 parts) are stirred together in a reaction flask fitted with a stirrer, water separating head, and thermometer, at 70° C. until the carbamate ester containing polymer dissolves. A 40% solution of formaldehyde in butanol (304 parts) is added and the pH adjusted to 4.5 with phthalic anhydride. The mixture is heated at reflux until 64 parts of water are removed by azeotropic distillation. The pH at this point is 3.8 and temperature of reflux is 113° C.' Sodium bicarbonate (15 parts) is added and the pressure is then reduced to 110 mm. Hg and 100 parts of volatiles are then removed by distillation. The resin, termed resin D, filtered while hot and the nonvolatile content is adjusted to 60% with butanol. The clear, water white resin has a viscosity of 2.0 stokes and a pH of 4.8. The ratio of formaldehyde to amino groups is 2.30.

A 0.003 inch film of the resin is baked at 130° C. for 30 minutes to give a hard (Sward hardness=46) film having excellent mar-resistance.

EXAMPLE 5

This control example is not illustrative of the present invention but is set forth for comparison.

A resin, termed resin E, is prepared by the procedure described in Example 4 employing the same conditions and reactants, except that no carbamate ester containing polymer is used. The ratio of formaldehyde to amino groups it 2.30, the same as in Example 4. All of the amino groups in this example are supplied by the melamine.

EXAMPLE 6

This example illustrates the production of a modified carbamate ester aminotriazine resin in which 33% of the amino reactant is carmamate containing polymer.

A modified carbamate ester aminotriazine polymer, hereinafter termed resin F, is prepared by the procedure described in Example 4 employing the same conditions, times, and reactants, except that the quantity of the carbamate ester containing polymer is one-half of the quantity of melamine employed and that the quantity of formaldehyde is adjusted to provide the same ratio as in Example 4.

EXAMPLE 7

This example illustrates the compatibility, hardness, solvent-resistance, and impact-resistance properties of compositions comprising modified carbamate ester aminotriazine polymers and urethane-modified polyesters.

A urethane-modified polyester (85 parts) in a suitable solvent having a hydroxyl number of 75, is mixed with various aldehyde-modified resin (15 parts). The urethane- modified polyester is similar to a linear polyester but diisocyanate units have replaced some of the dibasic acid units in the polymer backbone by procedures well known in the art. The nonvolatile content of the mixture is adjusted to 50% to form a coating composition. Clear film coatings 0.003 inch thick are prepared on a glass substrate. The coated substrate is then placed in an oven for 30 minutes at 150° C. to cure the coating. The coated substrate is then removed from the oven, cooled, and various tests conducted on the coating, the triazine polymers and acrylic resins.

TABLE I

| Composition of the nonvolatile component of the coating (percent of each component) | Amino reactant supplied by carbamate ester containing polymer (wt. percent) | Compatibility [1] | Hardness [2] (Sward No.) | Solvent [3] resistance (No.) | Flexibility [4]/reverse impact strength (in.-lb.) |
|---|---|---|---|---|---|
| 85% urethane-modified polyester resin, 15% resin C. | 0 | Poor | 34 | 2 | 45 |
| 85% urethane-modified polyester resin, 15% resin A. | 10 | Good | 39 | 5 | 35 |
| 85% urethane-modified polyester resin, 15% resin B. | 20 | do | 36 | 7 | 50 |

[1] Compatibility is determined by observing and grading the cured coating as follows: Good—a clear, transparent film; Fair—a hazy, or bluish-hazy, film; Poor—a cloudy film.
[2] Hardness readings are given in actual Sward numbers. The larger the number, the harder the film.
[3] Solvent-resistance is determined by placing a drop of about 0.5 cc. of xylene at 20° C. on the coating, then removing the drop with a clean, dry cloth after a period of ten minutes, observing the underlying surface and noting the effect as follows: 10=no effect; 0=complete disintegration of the coating.
[4] A two pound weight is dropped from a designated height onto the back of the panel coated with the film. A pass rating occurs if no crack or fracture of the film occurs. If the height of the drop where cracking first occurs is 22.5 inches, then the reverse impact strength is 2 lb. x 22.5 inches=45 in.-lb.

Thus, from the foregoing, it is seen that as the percentage of amino reactant supplied by the carbamate ester containing polymer increases, the compatibility and solvent-resistance properties improve without adversely affecting either the hardness or the flexibility.

EXAMPLE 8

This example illustrates the compatibility, hardness, solvent-resistance, and impact-resistance properties of compositions comprising modified carbamate ester aminotriazine polymers and acrylic resins.

A hydroxy-functional acrylic copolymer (70 parts) prepared from methyl methacrylate, styrene, butyl acrylate, and hydroxypropyl methacrylate, and having a hydroxy number of 60, is mixed with monobutyl phosphoric acid (1 part) and various aldehyde-modified resins (29 parts). The nonvolatile content of the mixture is adjusted to 50% to form a coating composition. Clear film coatings 0.003 inch thick are prepared on a glass substrate. The coated substrate is then baked in an oven for 30 minutes at 125° C. to cure the coating. The coated substrate is then removed from the oven, cooled, and various tests conducted on the coating, the results of which are listed in Table II.

TABLE II

| Resin | Carbamate ester containing polymer (wt. percent) | Compatibility | Sward hardness | Xylene resistance |
|---|---|---|---|---|
| E | 0 | Poor | 46 | 3 |
| F | 33 | Fair | 44 | 7 |
| D | 67 | Good | 50 | 10 |

Thus, it is seen from the foregoing that as the percentage of amino reactant supplied by the carbamate ester containing polymer increases the compatibility and solvent-resistance properties improve without adversely affecting either the hardness or the flexibility.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A modified carbamate ester aminotriazine polymer composition comprising the reaction product of:
    (a) a carbamate ester containing polymer which is the reaction product of urea and a polyester having three or more free hydroxyl groups, and
    (b) an aminotriazine having at least two reactive amino groups, and
    (c) an aliphatic monoaldehyde of 1 to 18 carbon atoms, said composition containing reactive amino groups of which 1% to 95% are derived from the carbamate ester containing polymer, the remainder being derived from the aminotriazine, said composition containing from 5% to 95% by weight of the carbamate ester containing polymer, and the ratio of the aldehyde to the total reactive amino groups supplied by the carbamate ester containing polymer and the aminotriazine being from 1 to 3.

2. The composition of claim 1 wherein the polyester having three or more free hydroxyl groups is derived from a polycarboxylic acid and a polyol having at least three hydroxyl groups and the aminotriazine has the formula:

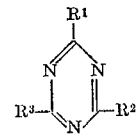

wherein $R^1$, $R^2$ and $R^3$ are members selected from the group consisting of hydrogen, lower alkyl, aryl, aralkyl, amino; or amino substituted with lower alkyl, aryl, or aralkyl, with the proviso that the compound have at least two reactive amino groups.

3. The composition of claim 2 wherein said polyol is a triol.

4. The composition of claim 1 wherein said aminotriazine is melamine.

5. The composition of claim 1 wherein said aldehyde is formaldehyde.

6. A composition comprising the acidic reaction product of an alcohol with the composition of claim 1.

7. A substrate coated with a layer comprising the cured composition of claim 1.

8. A curable blend comprising the composition of claim 1 and a member selected from the group consisting of acrylic resins and hydroxy-containing polyesters.

9. A method of producing the carbamate ester aminotriazine polymer composition of claim 1 comprising the step of reacting at a temperature of 40° C. to 120° C. in an aqueous medium of pH 1 to 14 or in an alcoholic medium of pH 7 to 14,
    (a) a carbamate ester containing polymer which is the reaction product of urea and a polyester having at least three free hydroxyl groups, and
    (b) an aminotriazine having at least two reactive amino groups, and
    (c) an aliphatic monoaldehyde of 1 to 18 carbon atoms.

References Cited

UNITED STATES PATENTS 2,956,964  10/1960  Christenson et al. ____ 260—21

OTHER REFERENCES

German printed application B 26,593, Jan. 5, 1956, Meyer et al.

MURRAY TILLMAN, Primary Examiner

J. C. BLEUTGE, Assistant Examiner

U.S. Cl. X.R.

260—15, 22, 67.6, 850, 856, 33.4, 29.4, 33.2; 117—124, 161

UNITED STATES PATENT OFFICE
CERTIFICATE OF CORRECTION

Patent No. 3,464,938      Dated September 2, 1969

Inventor(s) John David Nordstrom

It is certified that error appears in the above-identified patent and that said Letters Patent are hereby corrected as shown below:

Column 2, line 49, "evolved by" should read --evolved as--.

Column 6, line 4, "190°C." should read --180°C.--.

Column 8, lines 74 and 75, "triazine polymers and acrylic resins" should read --results of which are listed in Table 1--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents